(12) United States Patent
Ruch et al.

(10) Patent No.: US 11,085,894 B2
(45) Date of Patent: Aug. 10, 2021

(54) SENSOR APPARATUS WITH LIQUID CONTAINER AND WIPER

(71) Applicant: International Business Machines Corporation, Armonk, NY (US)

(72) Inventors: Patrick Ruch, Pratval (CH); Luca Capua, Lausanne (CH)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/282,452

(22) Filed: Feb. 22, 2019

(65) Prior Publication Data

US 2020/0271610 A1  Aug. 27, 2020

(51) Int. Cl.
*G01N 27/28* (2006.01)
*G01N 27/416* (2006.01)
*B65D 81/22* (2006.01)
*B08B 1/00* (2006.01)

(52) U.S. Cl.
CPC ........... *G01N 27/283* (2013.01); *B08B 1/005* (2013.01); *B65D 81/22* (2013.01); *G01N 27/4167* (2013.01)

(58) Field of Classification Search
None
See application file for complete search history.

(56) References Cited

U.S. PATENT DOCUMENTS

| | | | |
|---|---|---|---|
| 3,440,525 A * | 4/1969 | Cardeiro | G01N 27/28 324/438 |
| 5,421,981 A | 6/1995 | Leader et al. | |
| 5,582,698 A | 12/1996 | Flaherty et al. | |
| 5,762,185 A * | 6/1998 | Dulger | G01N 27/283 206/207 |
| 5,827,948 A | 10/1998 | Martell et al. | |
| 2011/0247230 A1 | 10/2011 | Goldstein et al. | |

(Continued)

FOREIGN PATENT DOCUMENTS

| | | | |
|---|---|---|---|
| DE | 10151232 A1 * | 5/2003 | ........... G01N 27/283 |
| DE | 20 2006 007 648 U1 | 7/2006 | |
| JP | 2004-117307 A | 4/2004 | |

OTHER PUBLICATIONS

Machine translation to English of DE 101 51 232 (Year: 2003).*

(Continued)

*Primary Examiner* — J. Christopher Ball
(74) *Attorney, Agent, or Firm* — Scully, Scott, Murphy & Presser, P.C.; Daniel P. Morris.

(57) ABSTRACT

A sensor apparatus comprising a portable sensor body. The sensor body includes a support with one or more sensing electrodes, and electric connections connecting to the electrodes. The apparatus further includes a storage container, designed to receive at least a part of the support that includes one or more of the electrodes, for storing the sensor body. The container comprises a deformable wiper. The wiper is shaped correspondingly with the support and electrodes thereof, to wipe liquid (and/or other materials contained therein) off the support responsive to inserting the latter in the container and, conversely, responsive to de-inserting the support from the container. Mutually corresponding parts of the sensor body and the container may form a fastener, so as to be able to create a non-permanent joint between the sensor body and the container responsive to the sensor body being fully inserted in the container.

20 Claims, 5 Drawing Sheets

(56) References Cited

U.S. PATENT DOCUMENTS

2011/0255912 A1   10/2011   Lhoyer
2015/0182003 A1   7/2015    Neuner et al.
2018/0027943 A1   2/2018    Rosario-Melendez et al.

OTHER PUBLICATIONS

Hanna Instruments, "Guidelines for pH Electrode Maintenance and Use", https://hannainst.com/ph-electrode-maintenance-calibration-guide, Accessed on Feb. 21, 2019, 4 pages.

* cited by examiner

SENSOR APPARATUS WITH LIQUID CONTAINER AND WIPER

BACKGROUND

The present disclosure relates in general to sensor apparatuses involving portable sensors and methods of handling such apparatuses. In particular, it is directed to a sensor apparatus with a portable sensor body and a liquid container for receiving the sensor body.

Electrochemical sensors are used for characterizing liquids. When not in use, such sensors are typically stored in a particular reference liquid to ensure reproducible conditions at the start of each new measurement and also to prevent dry-out of the sensing material.

A well-known example is the storage of pH electrodes, which must be stored in an adequate solution, in order to keep the glass membrane of the pH electrode hydrated. Such an electrode should for example not be stored in distilled or deionized water but rather in a KCl-based storage solution. A small quantity of the storage solution may for example be placed in a protective cap placed on the pH probe, or in a storage vial, in which the probe is stored.

However, conventional means used to store the electrode in a KCL-based solution typically results in a build-up of salt crystals around the cap of the storage container as well as on the sensing electrode. Such crystals need be rinsed prior to performing measurements, else they could re-dissolve in the analyte and affect the measurement.

Even for electrochemical sensors that are not prone to dry-out, not storing the electrode in an adequate solution causes ill-defined conditions of the sensor at the start of measurements, which results in a poor reproducibility of the measurements.

The contamination of the analyte solution by the reference solution and, conversely, the contamination of the reference solution by the analyte solution, is a problem that usually requires thorough rinsing and drying of the sensor (especially for small analyte volumes).

SUMMARY

According to a first aspect, the present invention is embodied as a sensor apparatus. The apparatus comprises a portable sensor body. This sensor body includes a support with one or more sensing electrodes, as well as electric connections connecting to the electrodes. The apparatus further includes a storage container, which is designed to receive at least a part of the support (e.g., the part that includes one or more of said electrodes), for storing the sensor body when not in use. Remarkably, the container comprises a deformable wiper. The wiper is shaped correspondingly with the support and electrodes thereof, in order to wipe liquid (and other materials contained therein) off the support upon inserting the latter in the container and, conversely, upon de-inserting the support from the container, in operation.

In embodiments, mutually corresponding parts of the sensor body and the container form a fastener, so as to be able to create a non-permanent joint between the sensor body and the container when the sensor body is fully inserted in the container.

According to another aspect, the invention is embodied as a method of handling a sensor apparatus such as described above. Accordingly, inserting the portable sensor body into the container results in wiping substances off the support. Conversely, if the sensor body is initially in the container, the sensor body may be de-inserted from the container, causing the wiper to wipe off residual liquid of the storage solution (as well as undesired particles, such as KCL crystals, if any) from the support.

Apparatuses and methods embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

The present inventors have perceived a need for improving the ease-of-use and reproducibility of measurements performed by electrode-based sensors such as electrochemical sensors. They accordingly came to devise a new solution to the storage of such sensors, which primarily relies on a deformable wiper arranged in the storage container.

In reference to FIGS. 1A-1B, 4A-4C, and 6, a first aspect of the invention is now described in detail, which concerns a sensor apparatus.

Figure 1A:
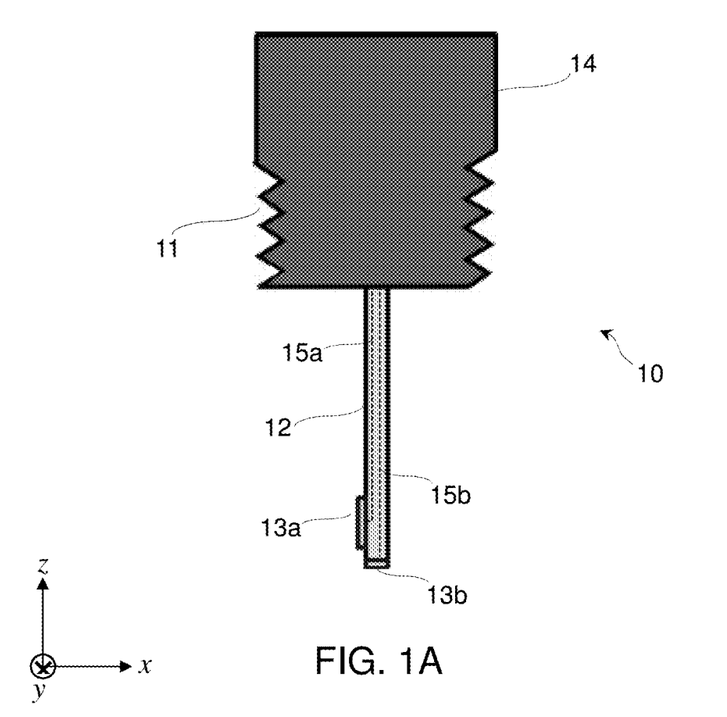
FIGS. 1A-1B show side views of two components of an apparatus according to embodiments, namely a sensor body (FIG. 1A) and a container (FIG. 1B) for storing the sensor body, when not in use. The container is equipped with a flexible wiper to wipe off undesired substances from the sensor body, when (de)inserting the latter into (from) the container, as in embodiments.
Figure 4A:
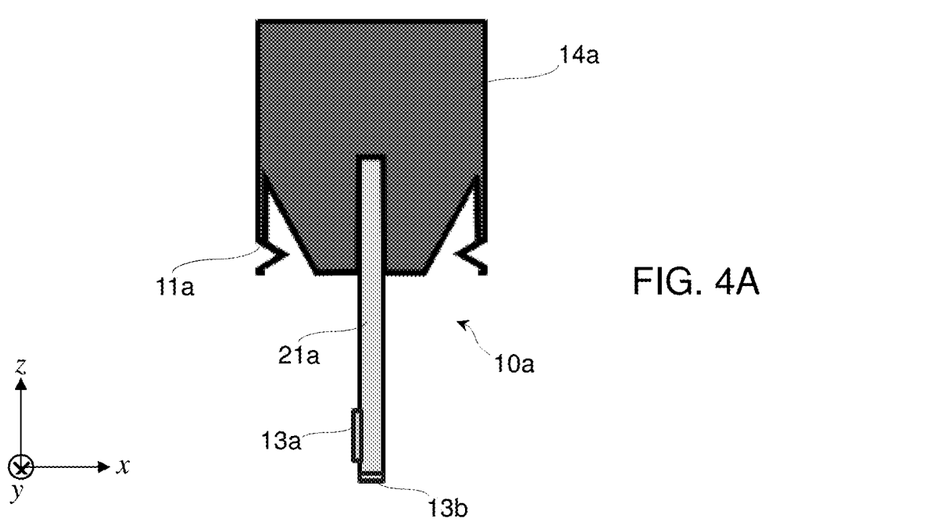
FIGS. 4A and 4B are side views of a sensor body and a container, as involved in variants to FIGS. 1A-1B. Instead of matched pair of threads as in FIG. 1A-1B, the components now form an interference fit mechanism.

This apparatus includes a portable sensor body 10, 10a. The sensor body may be autonomous, i.e., include electronics to read out measurement signals and otherwise control the sensor body, if necessary. In variants, the sensor body may need be connected to a peripheral 40, as assumed in the apparatus 1 shown in FIG. 6. Examples of sensor bodies 10, 10a are schematically depicted in FIGS. 1A and 4A.

The sensor body 10 notably includes a support 12, which itself comprises one or more sensing electrodes 13a, 13b. The support may for instance be essentially planar, to accommodate (an array of) electrodes on one or each plane thereof. In variants, however, the support is essentially cylindrical, e.g., shaped as a rod, or the like, as assumed in FIGS. 1A-1B. The support 12 may for example be essentially made of a polymer, glass, or a semiconductor. The electrodes may possibly be arranged on an external surface of the support 12 or be partly built-in in the support 12.

The sensor body 10 further includes electric connections 15a, 15b, which connect to the electrodes 13a, 13b. Such connections may possibly be provided as external connections, e.g., as electric traces patterned on a surface of the body 10 (notably on the support 12). However, the connections 15a, 15b are preferably formed inside the support 12, at least partly, so as to protect them from interactions with external media.

In addition, the apparatus comprises a storage container 20, e.g., a receptacle formed as a storage cap or vial (e.g., resembling a test tube). This container 20 is designed to receive the support 12, at least partly, for the purpose of storing the sensor body 10 when not in used. The container may for example be designed to rest on a surface with the body 10 capping the container, as assumed in FIGS. 1A-1B, 2A-2D, 3A-3D, 4A-4C. Conversely, the container may also be designed so as to be capped on the sensor body, in variants (not shown) to the designs of FIGS. 1A-1B, 2A-2D, 3A-3D, 4A-4C. In all cases, at least a part of the sensor body (namely the part of the support 12 where electrodes are arranged) will be received in a cavity formed in the container.

Interestingly here, the container 20 comprises a deformable wiper 23, 23a-d. Various wiper designs can be contemplated, as illustrated in FIGS. 1A-1B, 4A-4C, and 5A-5C. In all cases yet, the wiper need be somehow shaped in accordance with the support 12 and electrodes 13a, 13b thereof, in order to be able to wipe liquid (as well as other undesired substances, if necessary) off the support 12, when inserting the sensor body 10 in the container 20, and, conversely, when de-inserting the body 10 from the container if the latter includes a storage solution, as discussed below. In addition to the probed liquid or residual storage solution, other undesired materials (such as KCl crystals, for example) may advantageously be filtered by the wiper, in operation. Excess liquid, potential crystals, and other undesired particles or substances are collectively referred to as "substances" in the appended claims and in some places of the present description.

The present sensor apparatuses may come as a kit, including several components 10, 20, 30, 40. In addition to the sensor body 10 and the container 20 described above, such apparatuses may possibly comprise a peripherical electronic device 40, to which the sensor body 10 can be connected, e.g., to perform readout and/or otherwise control the sensor body 10, as assumed in FIG. 6. Namely, electrodes 13a, 13b of the sensor body 10 may be electrically connected to the device 40 via the connections 15a, 15b, for controlling and/or reading out signals obtained from the electrodes 13a, 13b, in operation. Other peripheral devices 30 may possibly be included, as discussed later in reference to the present methods.

The sensor bodies 10, 10a depicted in the accompanying drawings have a form factor; they are grippable (i.e., they can be held in hand). As further seen in FIGS. 1A and 4A, the sensor bodies 10, 10a preferably include gripping means 14, 14a, e.g., provided on the non-sensing end of the support 12. The sensor body may for example be shaped as a dipstick or have any other ergonomic shape inspired from known handheld devices. In general, the sensor body may be designed for portability purposes, while being reasonably safe, e.g., not prone to leakage or breaking.

Electrodes 13a, 13b are preferably arranged at a lower end (the sensing end) of the support 12, opposite to the gripping means 14, if any. Such electrodes are usually small in comparison with the support. They will typically not substantially modify the geometry of the support, such that the wiper 23, 23a-d may be essentially designed in accordance (e.g., complementarily) with the support 12. Still, care should be taken so as for the wiping action of the wiper 23 not to damage the electrodes.

Figure 1B:
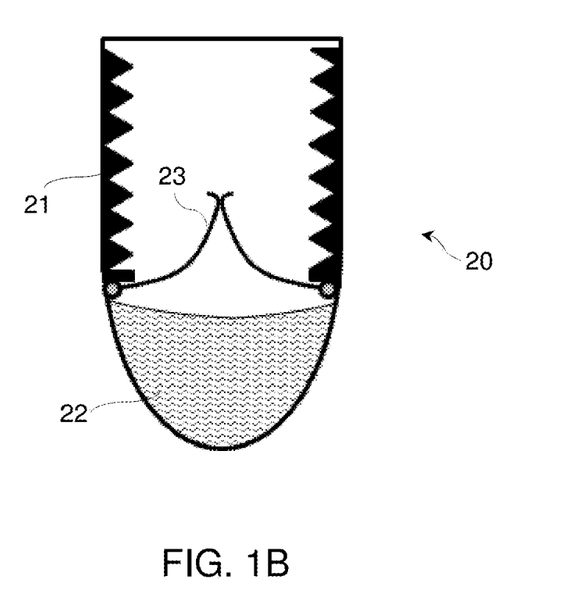
Figure 2A:
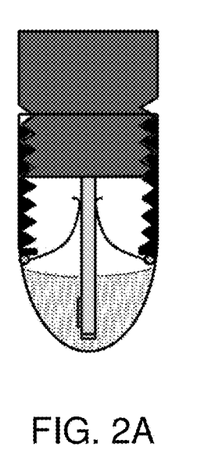
FIGS. 2A-2D show a sequence of views of a sensor body and a container such as shown in FIGS. 1A-1B. The sequence illustrates how excess liquid of the storage solution is wiped off from the sensor body upon de-inserting the latter from the container, as in embodiments.
Figure 2B:
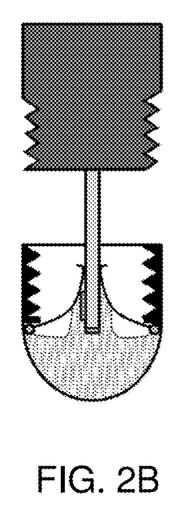
Figure 2C:
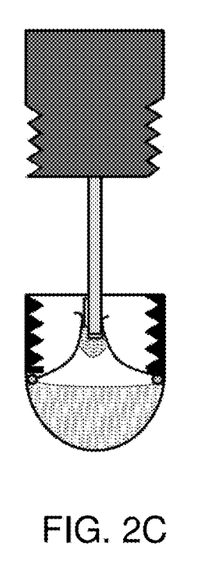
Figure 2D:
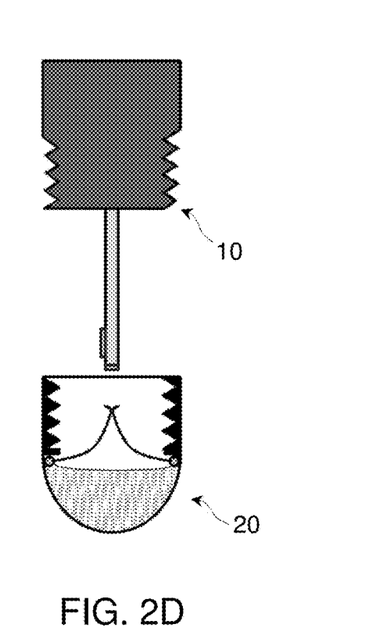
Figure 3A:
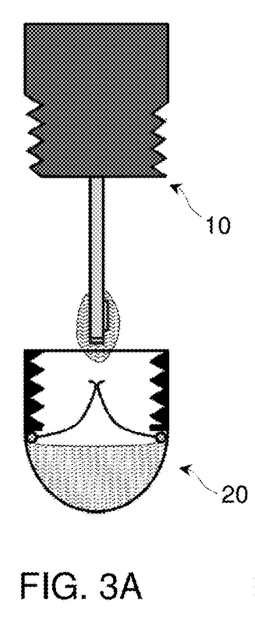
FIGS. 3A-3D similarly illustrates how undesired substances are wiped off from the sensor body upon inserting the latter back into the container, e.g., after having performed a measurement, as in embodiments.
Figure 3B:
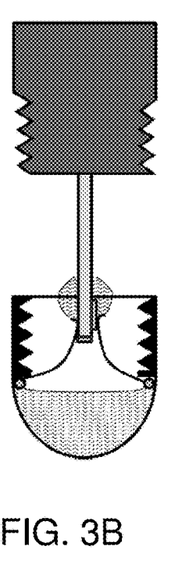
Figure 3C:
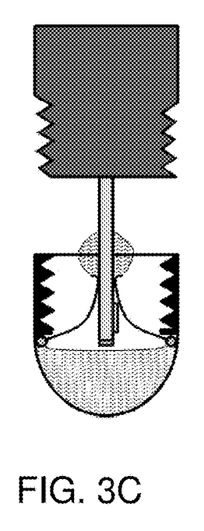
Figure 3D:
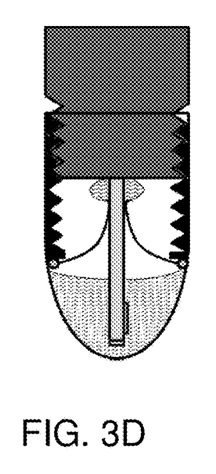
Figure 4B:
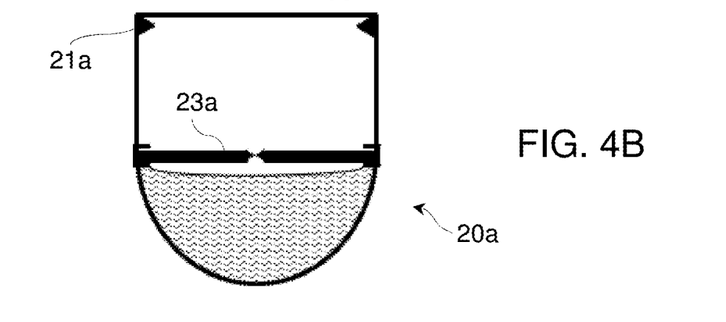
Figure 4C:
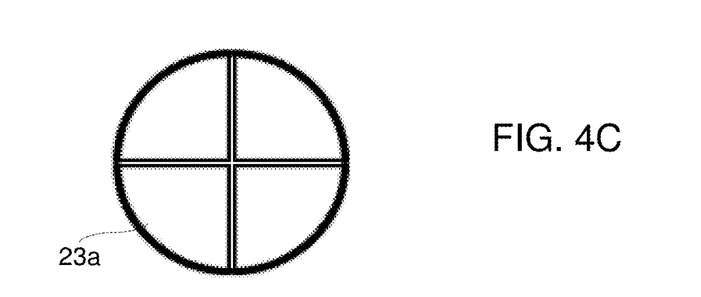
FIG. 4C is a top view of the flexible wiper, which here includes quadrant-like, flexible tabs, as in embodiments.
Figure 5A:
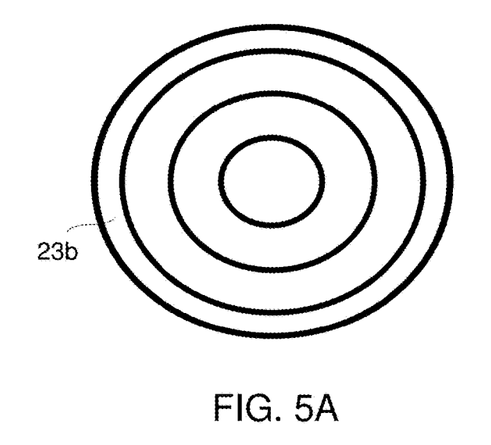
FIGS. 5A-5C are 3D views of possible types of deformable wipers, as involved in other embodiments.
Figure 5B:
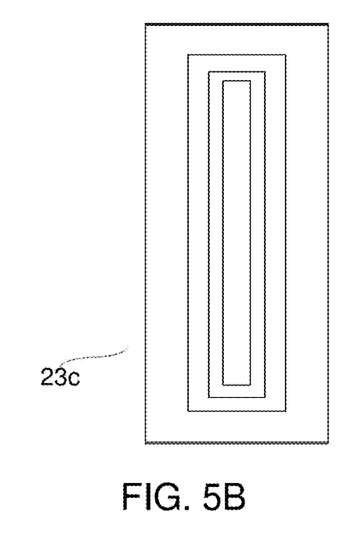
Figure 5C:
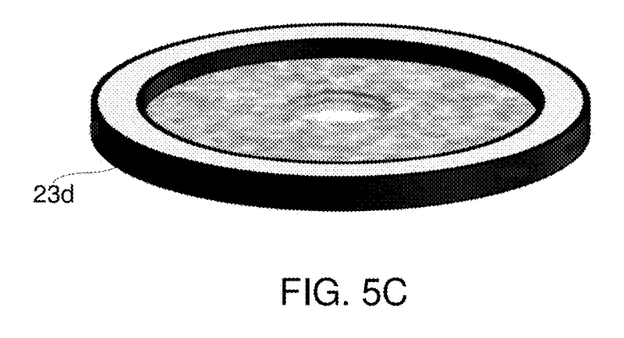

This deformable wiper may comprise one or more elements that are able to deform (e.g., elastically) under stress, or two or more elements, where an element is movable with respect to another element, such that the wiper is, as a whole, deformable. In all cases, the wiper 23 is designed to allow insertion of the support 12 (at least partly) into the container 20, though the wiper 23. The wiper may for instance comprise one, two or more flexible parts (or tabs), such as shown in FIG. 1B or 4B and 4C. Such parts may possibly be hinged, e.g., formed with living hinges (i.e., flexible hinges or flexure bearings). The wiper may notably form a single slit (FIG. 5B), especially if the support 12 is essentially planar, or two intersecting slits (as in FIG. 4C). The flexible parts of the wiper may for example be shaped as a conical gasket, which is upwardly urged in its default, resting position (i.e., when not solicited by the support 12), or two flexible lips that oppositely urge upwardly toward the aperture of the container, as assumed in FIG. 1B. It may also be formed as two or more, e.g., four flexible tabs, which flexibly hinged. For instance, in the design of FIG. 4C, the flexible parts form quadrant-like tabs, which, interestingly, are compatible with both planar and cylindrical supports.

In embodiments, the wiper is axially symmetric (as in FIGS. 1B, 5A and 5C), especially if the support 12 is essentially cylindrical. The wiper may notably consist of one or more elastically deformable rings, which may possibly have a gradually decreasing size to allow a progressive wiping upon insertion, as assumed in FIGS. 5A and 5B. The wiper shall typically comprise an elastomer (e.g., rubber). In variants, though, it may further involve foam or sponge materials or textiles, as in FIG. 5C. Many other variants could be devised, e.g., the wiper may have radially protruding fins (inwardly protruding, not shown). Also, several parts such as shown in FIGS. 1B, 4B, 4C, or 5A-5C may be combined to form the wiper. In all cases, the wiper 23 involves flexible (or otherwise deformable) portions, which allow undesired substances to be wiped off upon (de-) insertion of the sensor body 10.

The electrodes 13a, 13b may be used to perform electrochemical measurements. If necessary, receptors (e.g., bioreceptors, not shown) could be spotted on such electrodes, after de-insertion from the container 20. The electrodes 13a, 13b would then serve as physical converters (transducers)

for sensing analytes binding to such receptors. Alternatively, bare electrodes could be used for sensing properties of substances. In both cases, the electrodes are typically made of one or more electrically conducting layers of material(s), e.g., comprising gold, aluminum, nickel, and/or silver. Alternatively, the whole support 12 may itself be designed as an electrode, e.g., a pH electrode. In all cases, the support includes or otherwise make up one or more electrodes.

The sensing portion of the support 12 or the electrodes 13a, 13b may for example have a dimension that is between 0.4 mm and 2.0 mm, e.g., comparable to 0.5 mm leak-free reference electrodes that are commercially available. Thinner electrodes 13a, 13b may nevertheless be achieved, if needed. Conversely, larger sensing portions can be contemplated.

The storage container 20 is generally designed for storing the sensor body 10, when not in use. The storage container forms a cavity in which at least a part of the support 12 may be received. This container may for instance be designed jointly with the sensor body 10 such that the latter does not contact any surface of this cavity, when inserting the sensor body in the cavity. In particular, the sensor body 10 and the container 20 may be jointly designed so as to prevent the sensing apex of the sensor body 10 to reach the bottom of the cavity formed in the container 20, when inserting the sensor body 10. In variants, though, the cavity 20 receiving the body 10 may be designed so as to seal or fix the apex of the support 12, by way of a light interference fit at the bottom of the container, for example.

As evoked earlier, a storage solution 22 is preferably poured in the cavity, in order to serve as a reference liquid and/or preserve the electrodes. The storage solution may for example be distilled water, deionized water, or a KCl-based solution, depending on the electrode type. The storage solution 22 is meant for bathing the electrodes 13a, 13b, when the sensor body 10 is fully inserted in the container 20, i.e., when it has reached a normal storage position in the container. In a top-down configuration such as depicted in FIGS. 1A-1B, 2A-2D, 3A-3D the storage solution 22 should be provided in a quantity sufficient for bathing the electrodes 13a, 13b, once the sensor body 10 is fully inserted in the container 20 and the assembly 10-20 is in a normal, resting pose.

Note, the storage solution may possibly be immobilized within a gel, such as an electrolyte gel. Such gels are commercially available. Compared to simple liquid solutions, such electrolyte gels may have a reduced rate of evaporation and thus be advantageously employed in embodiments. In such cases, wiping elements such as described above can advantageously be relied on to wipe undesired substances off the sensor body and thus preserve the gel and storage solution.

One or more surface portions of the wiper 23 may possibly be processed so as to be hydrophobic. In addition, or in variants, one or more liquid pinning structures may extend along a peripheral region on an internal surface of the container 20, in the vicinity of the wiper 23. E.g., A liquid pinning structure extending below the wiper can be used to repel liquid from the storage solution 22 to retain this liquid when de-inserting the sensor body 10. This may further help in preventing or delaying evaporation of the storage solution from the cavity. Another pinning structure could be provided on the other side of the wiper 23, if necessary. Plus, a vent may be provided on top of the wiper, to vent liquid accumulated in this region.

The present solution, which relies on a deformable wiper, makes it possible to improve the reproducibility of measurements (e.g., electrochemical measurements) conducted with the sensor body 10, possibly over an extended period of time, and at least with substantially less manual intervention (for cleaning purposes) compared to conventional devices. The present apparatuses are notably suited for biosensing applications.

Referring to FIGS. 1A-1B, 2A-2D, 3A-3D, 4A-4C, mutually corresponding parts 11, 21; 11a, 21a of the sensor body 10, 10a and the container 20 may advantageously form a fastener, in order to be able to create a non-permanent joint between the sensor body 10 and the container 20. That is, once the sensor body is fully inserted in the container 20, the parts 10, 20 may form an integral object, which can easily and safely be transported.

As illustrated in FIG. 4A-4C, the fastening mechanism may for instance be an interference fit mechanism, such as a snap-fit mechanism (e.g., metal snap fasteners, spring clips, or other snap-type connectors), a press-fit mechanism, etc. Such mechanisms allow the sensor body 10a to be easily and quickly plugged in (and unplugged from) the container 20a. In general, the allowance of the interference fit may be refined to adapt the strength of fit, which may range from a loose fit, where the body 10a is easily removable, to a tight interference fit, whereby the body 10a and the container 20a forms an integral part, once fastened. The strength of fit need be refined based on the electrode types, their fragility, their costs, etc., as well as the application scenario contemplated.

In other embodiments such as depicted in FIGS. 1A-1B, 2A-2D, 3A-3D, the fastener is provided as a matched pair of threads 11, 21 formed both on the gripping means 14 and the container 20. For example, an external thread may be formed on the external cylindrical surface of the gripping means 14, while a complementary thread may be provided on the internal surface of the container 20. In variants (not shown), the external thread may be formed on the external cylindrical surface of the container 20, while a complementary internal thread may be provided on an internal surface of the gripping means, the latter having a radial cusp to cap the container, like a screw cap.

Referring more specifically to FIGS. 2A-2D, 3A-3D, and 6, another aspect of the invention is now described, which concerns methods of handling a sensor apparatus 1 such as described above. Aspects of such methods have already been described, implicitly, in reference to the present apparatuses; such aspects are only briefly described in the following.

Assume that the sensor body 10 has been removed from the container 20, e.g., to perform some measurements in a given substance (e.g., a liquid). As seen in FIGS. 3A-3D, the portable sensor body 10 can be inserted back into the container 20, e.g., by grasping the gripping means 14, for the wiper 23 to wipe undesired substances off the support 12. In particular, excess liquid is wiped off and thus maintained outside of the storage cavity of the container, thanks to the wiper. This way, the wiped substance does not come to contaminate the cavity and, in particular, the storage solution, if any.

And conversely, if the sensor body 10 is initially received in the container 20, it can be de-inserted from the container 20, for the wiper to wipe off residual liquid from the storage solution (as well as undesired particles, such as KCl crystals, if any) from the support, as illustrated in FIGS. 2A-2D. Once removed from the container, the sensor body 10 can be used for sensing, e.g., a liquid or specific analytes via the electrodes 13a, 13b of the sensor body 10. This may imply to first spot given receptors on the electrodes.

Figure 6:
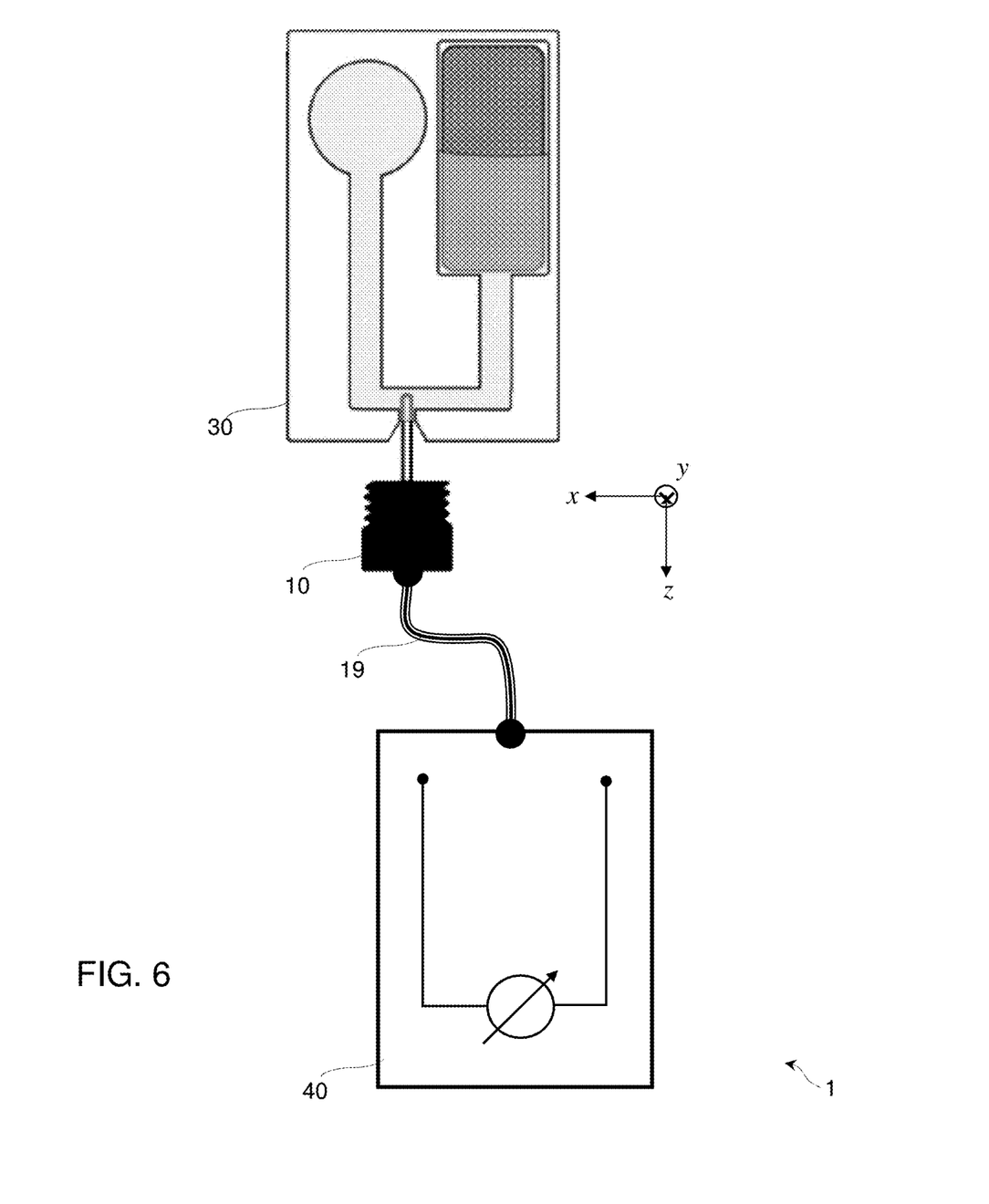
FIG. 6 is a top view that illustrates the use of an apparatus including peripheral components, in addition to a sensor body and a container such as shown in FIGS. 1A-1B. Namely, the sensor probe is laterally inserted in a microfluidic device to probe a liquid. The sensor body is otherwise connected to an electronic readout device, as in embodiments.

While sensing operations may generally be performed in a liquid or another substance, by merely dipping the sensor into this substance, FIG. 6 depicts a case where a microfluidic peripheral is involved, which allows the sensor body 10 to be laterally plugged therein, to perform measurements. Liquid is inserted via a loading pad and then capillary pulled (thanks to a capillary pump) through the flow path, where it comes to wet the apex of the sensor body 10. The entrance of the microfluidic device may further include a snap-fit mechanism to ensure easy, correct, and thus reproducible insertion conditions of the electrode support of sensor body 10. Another wiper may possibly be provided in the insertion conduit of the microfluidic peripheral, in order to further clean the support of sensor body 10, if necessary.

As described earlier, the sensor body 10 and the container 20 may be equipped with a fastener, e.g., formed by a matched pair of threads, as assumed in FIGS. 2A-2D, 3A-3D. In that case, the body 10 may first need be unscrewed (to enable the extraction, FIGS. 2A-2B) and, eventually, be screwed back on the container 20, to create a non-permanent joint between the sensor body 10 and the container. This way, an integral assembly 10, 20 is obtained, in which the sensing portion of the sensor 10 is secured, and which can safely be transported.

The present disclosure relates to a sensor apparatus. The apparatus may comprise a portable sensor body. This sensor body may include a support with one or more sensing electrodes, as well as electric connections connecting to the electrodes. The apparatus may further include a storage container, which may be designed to receive at least a part of the support that includes one or more of the electrodes, for storing the sensor body when not in use. The container may comprise a deformable wiper. The wiper may be shaped correspondingly with the support and electrodes thereof, in order to wipe liquid (and other materials contained therein) off the support upon inserting the latter in the container and, conversely, upon de-inserting the support from the container, in operation. Mutually corresponding parts of the sensor body and the container may possibly form a fastener, so as to be able to create a non-permanent joint between the sensor body and the container when the sensor body is fully inserted in the container. The present disclosure relates further to a method of handling a sensor apparatus such as described above.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A sensor apparatus comprising:
a portable sensor body, including
a support with one or more sensing electrodes, and
electric connections connecting to the electrodes; and
a storage container designed to receive at least a part of the support, for storing the sensor body, wherein the container comprises a deformable wiper, the deformable wiper shaped correspondingly with the support and electrodes thereof, in order to wipe substances off the support responsive to inserting the support in the container and, conversely, responsive to de-inserting the support from the container, in operation,
the deformable wiper comprising two or more flexible parts, which form one or more slits.

2. The sensor apparatus according to claim 1, wherein the container contains a storage solution and is designed to receive at least the part of the support that includes one or more of the electrodes, for bathing the one or more of the electrodes responsive to the sensor body being fully inserted in the container.

3. The sensor apparatus according to claim 2, wherein the storage solution is immobilized within a gel.

4. The sensor apparatus according to claim 3, wherein said gel is an electrolyte gel.

5. The sensor apparatus according to claim 1, wherein the wiper comprises two lips oppositely urged.

6. The sensor apparatus according to claim 1, wherein the wiper comprises an elastomer.

7. The sensor apparatus according to claim 1, wherein at least a surface portion of the wiper is hydrophobic.

8. The sensor apparatus according to claim 1, wherein the support is essentially planar.

9. The sensor apparatus according to claim 1, wherein mutually corresponding parts of the sensor body and the container form a fastener to create a non-permanent joint between the sensor body and the container responsive to the sensor body being fully inserted in the container.

10. The sensor apparatus according to claim 9, wherein the sensor body and the container are designed so as to prevent an apex of the sensor body to reach a bottom of a cavity formed in the container, upon inserting the sensor body in the container.

11. The sensor apparatus according to claim 9, wherein said sensor body further comprises gripping means.

12. The sensor apparatus according to claim 11, wherein said fastener is provided as a matched pair of threads formed on the gripping means and the container.

13. The sensor apparatus according to claim 11, wherein said fastener is provided by an interference fit mechanism formed by the gripping means and the container.

14. The sensor apparatus according to claim 1, wherein the apparatus further comprises a peripherical electronic device, to which the electrodes of the sensor body are electrically connected via the electric connections, for controlling and/or reading out signals obtained from the electrodes, in operation.

15. A method of handling a sensor apparatus, the method comprising
providing the sensor apparatus, the sensor apparatus comprising: a portable sensor body, comprising a support with one or more sensing electrodes, and electric connections connecting to the electrodes; and a storage container designed to receive at least a part of the support, for storing the sensor body, wherein the container comprises a deformable wiper, the deformable wiper shaped correspondingly with the support and electrodes thereof, and inserting the portable sensor body into the container for the wiper to wipe substances off the support, the deformable wiper comprising two or more flexible parts, which form one or more slits.

16. The method according to claim 15, wherein the sensor body is initially received in the container, which contains a storage solution, and the method further comprises, prior to inserting said sensor body, de-inserting the sensor body from the container, for the wiper to wipe off residual substances of the storage solution from the support, and sensing one or more analytes via the electrodes of the sensor body.

17. The method according to claim 15, wherein said sensor body further comprises gripping means, whereby the sensor body is inserted into the container by gripping said griping means.

18. The method according to claim 17, wherein mutually corresponding parts of the sensor body and the container form a fastener, whereby the sensor body is inserted into the container so as to create a non-permanent joint between the sensor body and the container.

19. A sensor apparatus comprising:

a portable sensor body, including a support with one or more sensing electrodes, and electric connections connecting to the electrodes; and a storage container designed to receive at least a part of the support, for storing the sensor body, wherein the container comprises a deformable wiper, the deformable wiper shaped correspondingly with the support and electrodes thereof, in order to wipe substances off the support responsive to inserting the support in the container and, conversely, responsive to de-inserting the support from the container, in operation, wherein the storage container contains a storage solution immobilized within a gel.

20. The sensor apparatus of claim 19, wherein the storage container is designed to receive at least the part of the support that includes one or more of the electrodes, for bathing the one or more of the electrodes responsive to the sensor body being inserted in the container.

* * * * *